United States Patent [19]
Stapleford et al.

[11] Patent Number: 4,521,881
[45] Date of Patent: Jun. 4, 1985

[54] DATA COMMUNICATION SYSTEM WITH INCREASED EFFECTIVE BANDWIDTH

[75] Inventors: Gary N. Stapleford, Londonderry; Andrew J. Borsa, Pelham, both of N.H.

[73] Assignee: Wang Laboratories, Inc., Lowell, Mass.

[21] Appl. No.: 317,292

[22] Filed: Nov. 2, 1981

[51] Int. Cl.³ .............................................. H04J 1/10
[52] U.S. Cl. ...................................... 370/72; 370/124; 455/3
[58] Field of Search ..................... 370/24, 30, 69.1, 71, 370/72, 123, 124, 121; 455/3, 5, 6, 15, 16

[56] References Cited
U.S. PATENT DOCUMENTS

| | | | |
|---|---|---|---|
| 2,064,907 | 12/1936 | Green | 455/16 |
| 3,008,008 | 11/1961 | Pickett et al. | 370/71 |
| 3,029,312 | 4/1962 | Kehm | 370/71 |
| 4,049,914 | 9/1977 | Anderson et al. | 370/124 |
| 4,210,779 | 7/1980 | Simokat | 370/72 |
| 4,262,171 | 4/1981 | Schneider et al. | 370/124 |
| 4,312,064 | 1/1982 | Bench et al. | 370/72 |

*Primary Examiner*—Benedict V. Safourek
*Attorney, Agent, or Firm*—Michael H. Shanahan; Kenneth L. Milik

[57] ABSTRACT

A broadband data communication system provides effective increased bandwidth for the transmission of electrical information signals in the system. The signal transmission medium is a coaxial cable having main receive and transmit branches, and having drop line pairs connected to the main branches at junction points. A plurality of user devices is connected to each drop line pair, including a particular set connected to a particular pair. Each user device of the set can transmit and receive signals of local frequencies in a selected bandwidth. Frequency isolation means is connected to the particular drop line pair adjacent its junction point, and passes signals of the local frequencies only from the transmit drop line to the receive drop line, while blocking signals of the local frequencies from transmission over the main cable branches. The particular set of user devices and the filter isolation means together define a subnet. Other subnets can use the same bandwidth of local frequencies without interference, thereby increasing the effective bandwidth of the system.

For communication between subnets, a master unit is provided in a subnet which can receive and transmit both at the local frequencies and at master frequencies outside the selected bandwidth; the frequency isolation means passes the master frequencies. The master translates communications from the subnet devices, at local frequencies, into master frequencies for transmission out of the subnet, and receives communications from outside the subnet at master frequencies for translation to local frequencies and transmission to the user devices of the subnet.

3 Claims, 4 Drawing Figures

DATA COMMUNICATION SYSTEM WITH INCREASED EFFECTIVE BANDWIDTH

This invention relates to broadband data communications systems using two-branch coaxial cable as the signal transmission medium.

It is desirable to provide a data communications system that is capable of simultaneously transmitting a range of information, such as text, data, electronic mail, facsimile and video, among a variety of different user devices, such as computers, word processing work stations, television receivers and transmitters, and the like. It is desirable to provide the capability of transmitting such information at many different rates, and using different protocols. A broadband system uses frequency division multiplexing to make possible the division of the total bandwidth carried by the transmission medium into many separate communications channels, to accommodate all these desired uses.

However, at best the bandwidth carried by any transmission medium is limited, and ultimately it is the bandwidth which limits the total capacity of the data communications system.

In most data communications applications it is found that the frequency of communication among particular user devices is directly related to the physical distance between them; that is, most commmunications to or from a particular device are with other devices physically close to it. Thus, for example, in a first distributed word processing system that is connected to a second distributed word processing system, most communications from a particular work station in the first system are with its local resources, such as the local storage disk and the local printer, while many fewer communications are with devices in the second system. Such a situation is also well recognized in the design of telephone switching systems.

It has been found possible to take advantage of this fact, and according to the present invention, in effect to duplicate a range of signal frequencies within the total bandwidth carried by the transmission medium, and thereby to increase the available capacity of the data communication system.

According to the invention, a broadband data communication system is provided for the transmission of electrical information signals among a plurality of user devices connected to said system. The system has a signal transmission medium comprising a two-branch coaxial cable having a main signal receive branch and a main signal transmit branch. The transmission medium is adapted to transmit signals of frequencies within a bandwidth including a selected bandwidth defining local frequencies. A plurality of drop line pairs are each connected to the main branches at a junction point, and each comprises a transmit and a receive drop line.

A plurality of user devices are connected to each drop line pair, including a particular set of user devices connected to a particular drop line pair. Each user device of the particular set includes means for transmitting and receiving signals of the local frequencies. The system further provides frequency isolation means connected to the particular drop line pair adjacent its junction point and adapted to pass signals of the local frequencies only from the transmit drop line to the receive drop line, while blocking signals of the local frequencies from transmission over the main cable branches. The particular set of user devices and the frequency isolation means together define a communications subnet.

In a preferred embodiment, the data communications system further includes at least one additional similar communications subnet connected to a different drop line pair. Each communications subnet further includes a master unit connected to the particular drop line pair. The bandwidth carried by the transmission medium further includes master frequencies outside the selected bandwidth, and the master unit has means for transmitting and receiving signals of the local frequencies, and further has means for transmitting and receiving signals of the master frequencies. The frequency isolation means is adapted to pass signals of the master frequencies between the main branches and the particular drop line pair. The master unit can translate communications from the user devices from the local frequencies to the master frequencies, and then transmit such communications to the remainder of the communications system, as well as receive communications from outside the subnet at the master frequencies and translate them to the local frequencies for communication to user devices within the subnet.

In a further embodiment, a broad band data communication system is provided for the transmission of electrical information signals among a plurality of user devices connected to the system. The system has a signal transmission medium comprising a coaxial cable having a signal receive branch and a signal transmit branch; the transmission medium is adapted to transmit signals of frequencies within a bandwidth including a selected bandwidth defining local frequencies. The system further has a plurality of user devices connected between the cable branches, each user device including means for transmitting and receiving signals of the local frequencies. The system further has at least one frequency isolation means connected between the cable branches, which is effective to divide the user devices into at least two groups each of physically contiguous devices. The frequency isolation means is adapted to pass signals of the local frequencies from the cable transmit branch to the cable receive branch only within a group of user devices while blocking signals of the local frequencies from transmission between the groups. Master units may be provided for communicating between groups, using master frequencies that are passed by the frequency isolation means.

Other objects, features and advantages will appear from the following detailed description of a preferred embodiment of the invention, together with the drawing, in which.

Figure 1:
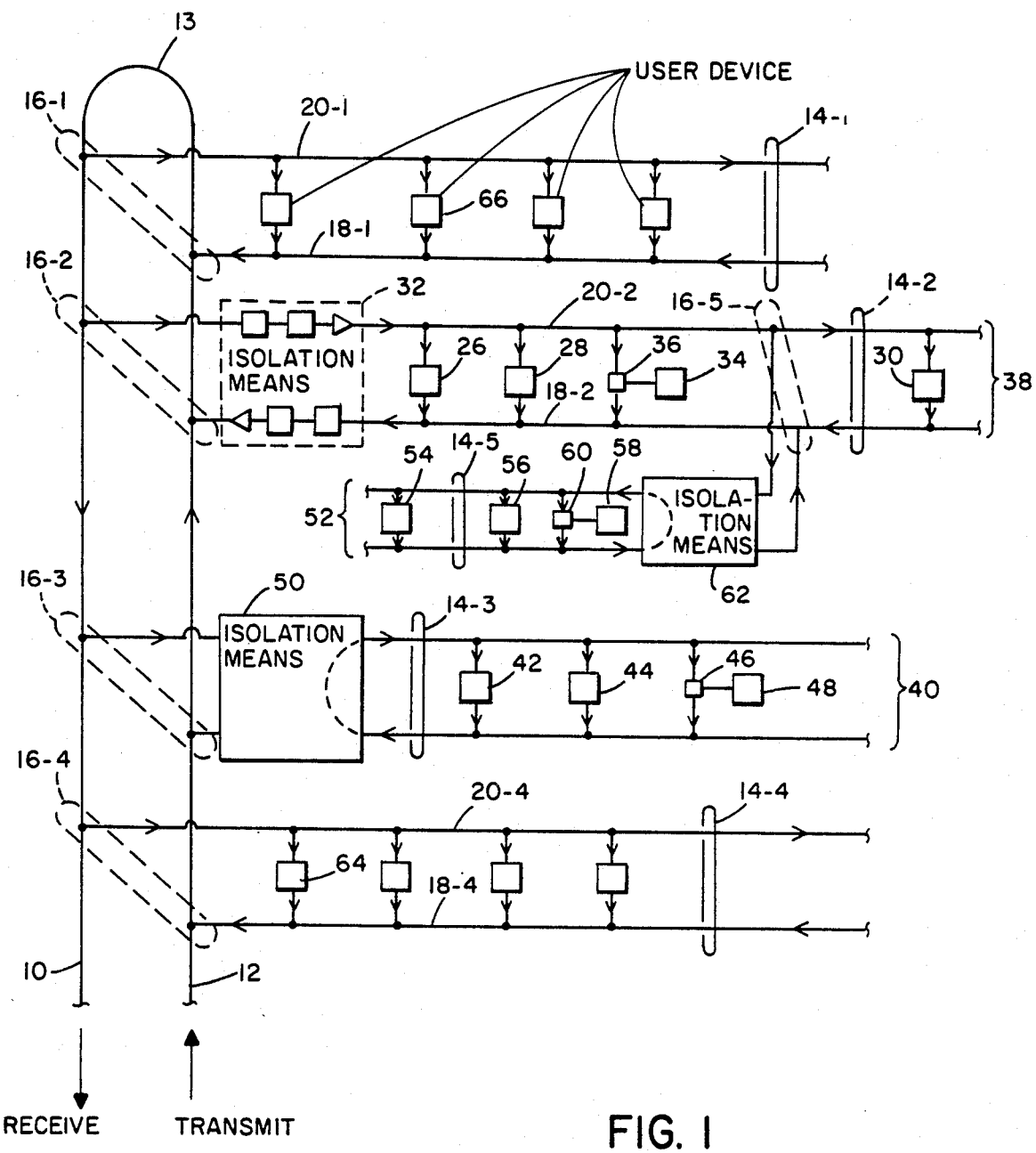
FIG. 1 is a schematic view of the data communications system of the invention.

Referring now to the drawing, and in particular to FIG. 1, a broadband data communications system comprises a two-branch coaxial cable having a main signal receive branch 10 and a main signal transmit branch 12 connected at head end 13 as shown in FIG. 1. As indicated by the arrows in FIG. 1, the signals flow toward the head end 13 on the transmit cable 12 and away from the head end on the receive cable 10. A plurality of coaxial cable drop line pairs 14 are attached to main branches 10 and 12. Each drop line pair 14 is connected to the main cable branches 10 and 12 at a junction point 16; the drop line pair comprises a transmit drop line 18 and a receive drop line 20. Transmit drop line 18 is connected to main transmit branch 12, and receive drop line 20 is connected to main receive branch 10. Signals are transmitted in a single direction only on the cable.

Figure 3:
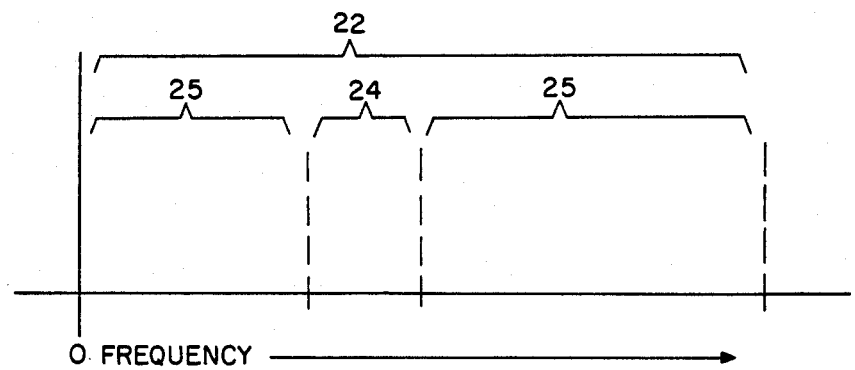
FIG. 3 illustrates the particular frequencies employed for communication in the invention.

Referring to FIG. 3, the coaxial cable of which the main branches and drop lines are composed is adapted to transmit signals of frequencies within a broad bandwidth 22. Within broad bandwidth 22 is a selected narrower bandwidth 24; frequencies within selected bandwidth 24 are defined herein as local frequencies. The remainder of the broad bandwidth is indicated by reference numeral 25, and includes certain frequencies defined herein as master frequencies. The selection of particular local and master frequencies are matters of design choice, and the invention is not limited to particular frequencies.

Referring again to FIG. 1, the data communications system has a number of user devices connected to the transmission medium. In particular, a set of user devices 26, 28 and 30 are connected to drop line pair 14-2. Such user devices may be, for example, work stations, master disk units, printers, central processors, television receivers, teletype machines, and the like.

Each of user devices 26, 28 and 30 includes means for transmitting and receiving electrical information signals at the local frequencies defined within selected bandwidth 24. Signals are transmitted to transmit drop line 18-2, and are received from receive drop line 20-2. In a particular embodiment of the invention, the user devices connected to drop line pair 14-2 are provided with frequency-agile modems (such as element 82, FIG. 2) and employ a multi-channel contention system, allowing up to thirty-two devices per channel to communicate with one another using frequencies within the selected bandwidth 24. The manner of designing a modem suitable for this purpose is well understood in the art and such modems will not be described in detail herein.

A frequency isolation means 32 is connected to drop line pair 14-2 adjacent junction point 16-2, that is, between the connection of the drop line pair to the main cable branches and the user devices that are connected to the drop line pair. As will be described in more detail in connection with FIG. 2, frequency isolation means 32 is adapted to pass signals of the local frequencies (within selected bandwidth 24) only from transmit drop line 18-2 to receive drop line 20-2 of the drop line pair 14-2. Frequency isolation means 32 is adapted to block signals of the local frequencies which are applied to it on transmit drop line 18-2 from reaching main transmit branch 12.

A master unit 34 is connected through a cable interface unit 36 to drop line pair 14-2. Master unit 34 has means for transmitting and receiving signals of the local frequencies, and also for transmitting and receiving signals of one or more master frequencies within frequency range 25 of the broad bandwidth (FIG. 3). Frequency isolation means 32 is adapted to pass signals of the master frequencies between the main cable branches 10 and 12 and the drop line pair 14-2.

The set of user devices 26, 28 and 30, together with the master unit 34 and cable interface unit 36 and the frequency isolation means 32, all connected to drop line pair 14-2, define a communications subnet 38.

A second similar communications subnet 40 comprises user devices 42 and 44, master unit 46 and cable interface unit 48, and frequency isolation means 50, all connected to drop line pair 14-3, all of which operate as described in connection with similar elements of subnet 38.

It will therefore be apparent that the user devices 26, 28 and 30 can communicate among themselves over drop line pair 14-2 and through frequency isolation means 32, by transmitting and receiving signals at the local frequencies, but that none of the local frequency signals transmitted are carried on the main cable branches 10 and 12 or reach devices 42 and 44. Similarly, devices 42 and 44 can communicate with each other over drop line pair 14-3 and through frequency isolation means 50, but none of the signals are carried on the main cable branches 10 and 12 or reach devices 26, 28 or 30. It is therefore possible for both communications subnets to operate using the same local frequencies (selected bandwidth 24) without interfering with one another, and the available selected bandwidth 24 is thereby in effect doubled. Since as many additional similar subnets may be added to the system as desired, the selected bandwidth 24 may be multiplied indefinitely to extend the capacity of the data communications system.

Although the majority of communications of user devices 26, 28 and 30 are among themselves, occasions arise when communication is required between a user device in subnet 38 and a user device in subnet 40. For example, a user device 28 in subnet 38 might be a work station, requesting a print service by a printer, such as device 44 in subnet 40. In such a case, the requesting user device 28 transmits its request, using a local frequency, to master unit 34. The signals representing this transmission are not passed by frequency isolation means 32. Master unit 34 in turn transmits the request, using a master frequency, to the master unit 46 of subnet 40. In effect, the master unit performs a frequency translation of the communication. The signals transmitted at the master frequency are passed by frequency isolation means 32 and 50. Master unit 46 in turn transmits the request, using a local frequency, to device 44, which performs the requested service.

A sub-subnet may be attached to an existing subnet. For example, referring still to FIG. 1, a sub-subnet 52 comprises user devices 54 and 56, master unit 58 and cable interface unit 60, and frequency isolation means 62, all attached to a drop line pair 14-5, which is connected to drop line pair 14-2 at junction point 16-5.

In the absence of a frequency isolation means such as 32 or 50, signals transmitted at local frequencies from user devices attached to drop line pairs such as 14-1 and 14-4 are transmitted over the main cable branches 10 and 12. Thus a user device 64 attached to drop line pair 14-4 can communicate directly, using local frequencies, with a user device 66 attached to drop line pair 14-1.

Figure 2:
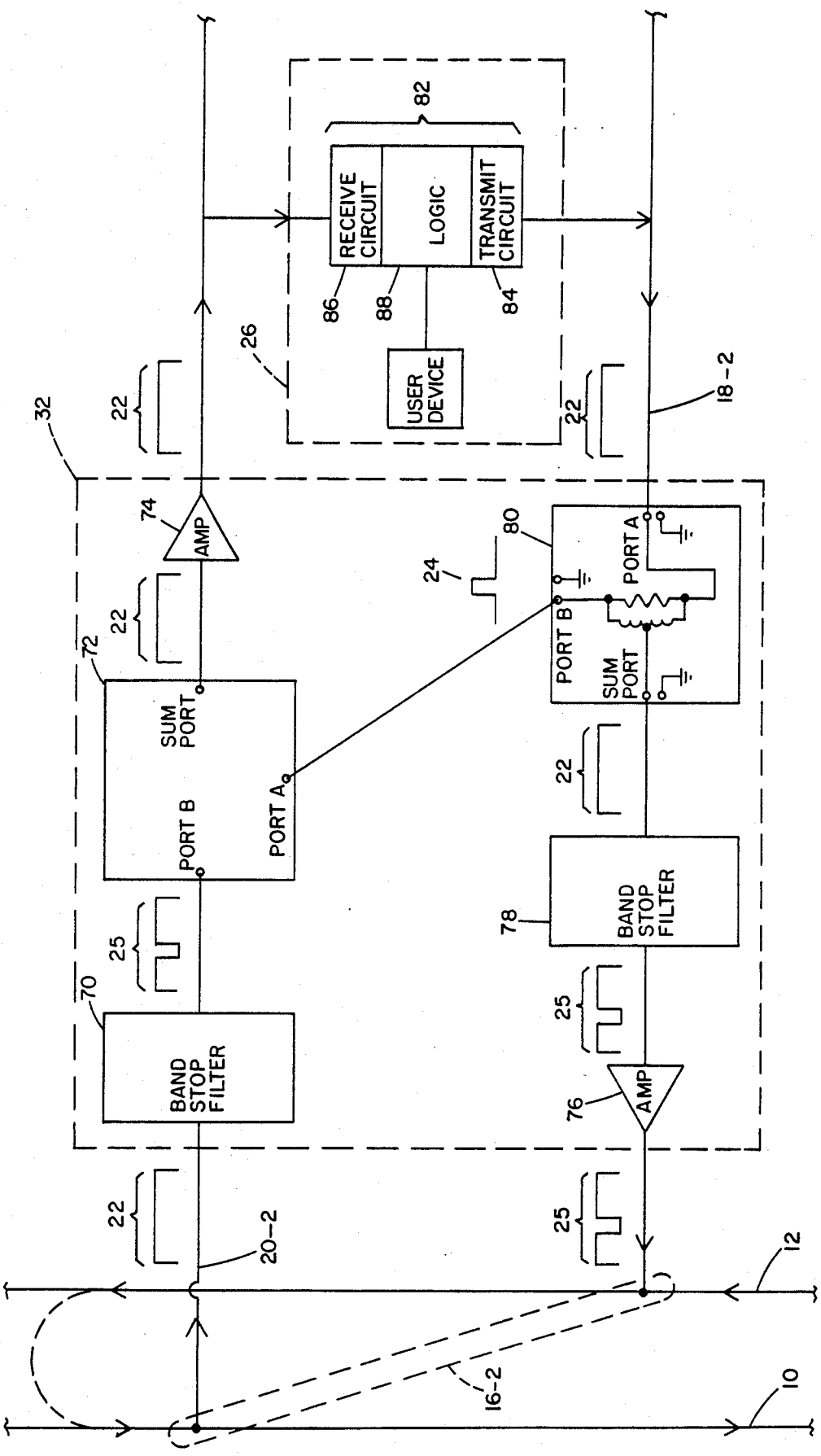
FIG. 2 shows in more detail the frequency isolation means of the invention.

Referring now to FIG. 2, the structure of frequency isolation means 32 is shown in more detail. (The structure of frequency isolation means 50 is the same as that of element 32.) Frequency isolation means 32 (also referred to as a diplex filter) comprises six elements: a first band stop filter 70 connected adjacent junction point 16-2 at which receive drop line 20-2 is connected to receive cable branch 10; first power splitter/combiner 72 connected to filter 70; first line amplifier 74 connected to first power splitter/combiner 72; second line amplifier 76 connected adjacent junction point 16-2 at transmit drop line 18-2; second band stop filter 78 connected to second amplifier 76; and second power splitter/combiner 80 connected to second filter 78.

The structure of a power splitter/combiner is shown in detail for element 80, and provides, as shown, three ports: Port A, Port B, and Sum Port. Port A of element 80 is connected to the end of transmit drop line 18-2 that comes from the transmit circuitry of the user devices of subnet 38; Port B is connected to Port A of element 72; the Sum Port of element 80 is connected to band stop filter 78. Of element 72, Port B is connected to band stop filter 70, while its Sum Port is connected to the end of receive drop line 20-2 that leads to the receive circuitry of the user devices of subnet 38.

The diplex filter or filter means 32 allows signals to pass between user devices in subnet 38 only within the selected bandwidth 24. In a particular embodiment, this selected bandwidth extends from 101 megahertz to 149 megahertz, with a 20 megahertz buffer at each end of the bandwidth. Signals at frequencies within this bandwidth do not appear on the main branches 10 and 12 when filter means 32 is connected to drop line pair 14-2.

In a commercial embodiment, the bandstop filter element is made to order to suit the particular bandwidth selected for use as local frequencies. The construction of such a filter, given the required bandwidth, is well understood in the art. The power splitter/combiner is made by Mini-Circuits, a division of Scientific Components Corp., of 2625 E. 14th Street, Brooklyn, N.Y., and is a 75 ohm version of a Model MSC-2-1. The amplifier is a Motorola CATV trunk amplifier, Model No. MHW-1221.

Each user device, exemplified in FIG. 2 by device 26, is connected to drop line pair 14-2 through a modem, which includes transmit circuitry 84, receive circuitry, 86, and other interface logic 88. The design of such a modem is well known in the data communications art and the modem will not be further described herein. Transmit circuitry 84 is adapted to transmit electrical information signals from user device 26 at frequencies within the selected bandwidth 24, and receive circuitry 86 is adapted to receive such signals and to provide the transmitted data to user device 26.

When user device 26 transmits data to another user device 28 in the same subnet 38, signals representing such data are transmitted by the transmit circuitry 84 of modem 82 to transmit drop line 18-2. Because signal transmission on the line is in one direction only, the signals travel toward frequency isolation means 32. The signals enter Port A of the second power splitter/combiner 80 and pass through the resistor-transformer network. Within this network, the signals appear at two places: across the transformer, which shifts the frequencies in phase by 180 degrees, and across the resistor, which is selected to match the reactance of the transformer but does not affect the input signal phase.

The phase-shifted signals that appear across the transformer are picked off by a center tap at the Sum Port and are applied to second band stop filter 78. These signals also appear at the resistor-transformer junction in combination with the resistor output. Because these signals are exactly 180 degrees out of phase and their output impedances match, they normally cancel each other out, with the result that there is no output at Port B. However, this effect does not occur for signals throughout the bandwidth 22, as will be explained.

The second band stop filter 78 transmits to the main cable 12 signals at all frequencies except those within the selected bandwidth 24. Signals at the blocked frequencies are in effect shifted directly to ground, resulting in a change in output impedance at this frequency range. This impedance change causes an impedance imbalance at the resistor-transformer junction of element 80, with the result that any signal of frequency within the selected bandwidth 24 passes through Port B of element 80. Thus, signals of all frequencies outside the selected bandwidth 24 pass through line amplifier 76 onto the main cable branches but do not pass through Port B of element 80; all signals of frequencies within the selected bandwidth 24 are effectively blocked by filter 78 but do pass through Port B of element 80.

Signals of frequencies within selected bandwidth 24 then pass from Port B of element 80 to Port A of second power splitter/combiner 72 where they are combined with signals of other frequencies entering the subnet 28 through first band stop filter 70 from the main receive branch 10 through Port B of element 72. Filter 70 prevents any signals at frequencies within the selected bandwidth that may be present on the main network cable from entering the subnet.

The combined signals leave element 72 through its Sum Port and pass through line amplifier 74. From amplifier 74, the signals reach the receive circuitry of the modems (not shown) of the user devices 28 and 30.

Figure 4:
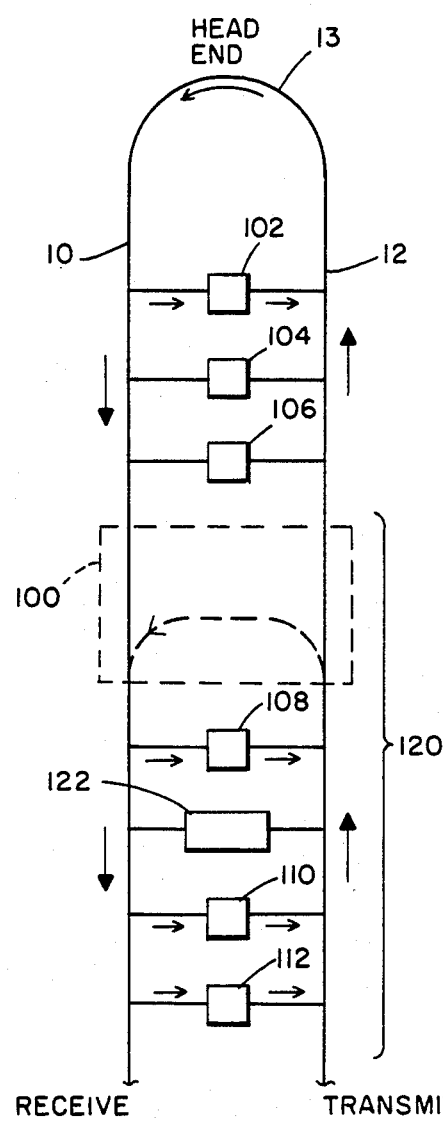
FIG. 4 shows a further embodiment of the invention.

Referring now to FIG. 4, an embodiment is shown in which, rather than isolating a set of user devices connected to a drop line pair, a section of the main cable branches is isolated to create a subnet. In this embodiment, frequency isolation means 100 is connected between the cable branches 10 and 12, the frequency isolation means being effective to divide the user devices connected to the cable branches into at least two groups each of physically contiguous devices. A first such group comprises user devices 102, 104 and 106; a second such group comprises user devices 108, 110, and 112. The frequency isolation means 100 is adapted to pass signals of the local frequencies from cable transmit branch 12 to cable receive branch 10 only within the group of user devices 108, 110, 112 while blocking signals of the local frequencies from transmission between those user devices and the group of user devices 102, 104, 106 (or further user devices not shown).

The group of user devices 108, 110 and 112 together with the frequency isolation means 100 together define a communications subnet 120 of said data communication system. As previously described, a master unit 122 can be provided for communication outside subnet 120; master unit 122 in effect translates signals received from devices within subnet 120 from local frequencies to frequencies outside the selected bandwidth, which are then passed by frequency isolation device 100 to other master units or other user devices outside the subnet 120. User devices outside subnet 120 can use the same selected bandwidth for local communication, so that this portion of the total bandwidth is used twice, or in effect doubled. It will be seen that a portion of the system between the two ends of the cable branches 10 and 12 could be isolated by means of two similar frequency isolation devices, if desired.

What is claimed is:

1. A communication system with a network for interconnecting a plurality of user devices having means for transmitting signals to and receiving signals from said communications system, said communication system having means for providing a plurality of frequency multiplexed communication channels operating on different frequency bands for concurrent communication between said user devices, wherein one or more but not all of said channels are dedicated as local service channels employing designated local frequencies, said communication system including frequency selective isolation means connected into said network intermediately between user devices, thereby subdividing said network into a plurality of local subnets, each local subnet interconnecting a plurality of said user devices, said frequency selective isolation means including means for blocking only the frequencies used by said local service channels from being transmitted from any of said local subnets to another while enabling transmission of frequencies other than those used by said local service channels between user devices connected on different subnets to isolate said subnets from one another as to the local service channels only, said communication system providing communications on a particular one of said local frequencies between two of said user devices both connected on a first of said subnets while concurrently and without interference providing communications on the same particular local frequency between two of said user devices both connected on a second of said subnets, while concurrently and without interference providing communications on a frequency other than local frequencies between user devices connected on different subnets.

2. A communication system for interconnecting a plurality of user devices having means for transmitting signals to and receiving signals from said communications system, and communication system having means for providing a plurality of frequency multiplexed communication channels operating on different frequency bands for concurrent communication between said user devices, the communication system having a network with a medium comprising a receive branch and a transmit branch, the receive branch transmitting signals in the direction away from a head end and the transmit branch transmitting signals in the direction towards the head end, the branches being connected at the head end to pass signals from the transmit branch to the receive branch, wherein one or more but not all of said channels are dedicated as local service channels employing designated local frequencies, and said system includes frequency selective isolation means connected into said network intermediately between user devices, thereby subdividing said network into a plurality of subnets, each subnet interconnecting a plurality of said user devices, each said frequency selective isolation means being connected into the network with connections to both the receive branch and the transmit branch looking towards the head end, and to both the receive branch and to the transmit branch looking away from the head end, each said frequency selected isolation means including means for reemitting on the receive branch in the direction away from the head end signals on said local frequencies entering the frequency selected isolation means on the transmit branch from the direction away from the head end, and means for reemitting on the receive branch in the direction away from the head end signals on other than local frequencies entering the frequency selected isolations means on the receive branch from the head end direction, means for reemitting on the transmit branch in the direction toward the head end signals on other than local frequencies entering the frequency selected isolations means on the transmit branch from the direction away from the head end, means for blocking signals on local frequencies from transmission between one subnet and another, said communication system providing communications on a particular one of said local frequencies between two of said user devices both connected on a first of said subnets while concurrently and without interference providing communications on the same particular local frequency between two of said user devices both connected on a second of said subnets, while concurrently and without interference providing communications on a frequency other than local frequencies between user devices connected on different subnets.

3. A combination, including a communications subnet for connection to a communication system at a junction point, said subnet interconnecting a plurality of user devices having means for transmitting signals to and receiving signals from said communications system, the subnet and the communications system having a communications medium comprising a receive branch and a transmit branch, the receive branch of the subnet transmitting signals in the direction junction point-toward-user devices and the transmit branch of the subnet transmitting signals in the direction user devices-towards-junction point, and an interfacing device interfacing the subnet to the communication system, said interfacing device including means for receiving signals on predesignated local frequencies from the transmit branch of the subnet and reemitting them onto the receive branch of the subnet, means for receiving signals on other than said predesignated local frequencies from the transmit branch of the subnet and reemitting them onto the transmit branch of the communications system, means for receiving signals on other than said predesignated local frequencies from the receive branch of the communications system and reemitting them onto the receive branch of the communications system, means for blocking signals on said predesignated local frequencies from being transmitted between the subnet and the communications system, said combination providing communications on said local frequencies between user devices both connected on said subnet without interferring with communications of user devices both connected elsewhere in said communications system and using the same local frequency, and further providing communications on frequencies other than said local frequencies between a user device connected on said subnet and user devices of the communication system connected elsewhere than on said subnet.

* * * * *